US010942696B2

(12) United States Patent
Sadak et al.

(10) Patent No.: US 10,942,696 B2
(45) Date of Patent: Mar. 9, 2021

(54) DISPLAY DEVICE SELECTION BASED ON HARDWARE CONFIGURATION

(71) Applicant: Microsoft Technology Licensing, LLC, Redmond, WA (US)

(72) Inventors: Christian Michael Sadak, Seattle, WA (US); Mario Emmanuel Maltezos, Redmond, WA (US); Adolfo Hernandez Santisteban, Bothell, WA (US); John Benjamin Hesketh, Kirkland, WA (US); Donna Katherine Long, Redmond, WA (US); Timothy D. Kviz, Seattle, WA (US); Arthur Charles Tomlin, Kirkland, WA (US); Jeffrey R. Sipko, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 118 days.

(21) Appl. No.: 15/640,231

(22) Filed: Jun. 30, 2017

(65) Prior Publication Data

US 2018/0329667 A1 Nov. 15, 2018

Related U.S. Application Data

(60) Provisional application No. 62/506,230, filed on May 15, 2017.

(51) Int. Cl.
*G06F 3/14* (2006.01)
*G06F 9/54* (2006.01)
(Continued)

(52) U.S. Cl.
CPC .............. *G06F 3/1423* (2013.01); *G05G 5/14* (2013.01); *G06F 1/1618* (2013.01);
(Continued)

(58) Field of Classification Search
CPC .... G06F 3/1423; G06F 1/1647; G06F 1/1677; G06F 1/1681; G06F 9/54; G06F 9/451;
(Continued)

(56) References Cited

U.S. PATENT DOCUMENTS

2011/0241973 A1 10/2011 Manning
2012/0026069 A1* 2/2012 Ohsaki .................. G06F 1/1616
345/1.2

(Continued)

OTHER PUBLICATIONS

"International Search Report and Written Opinion Issued in PCT Application No. PCT/US18/028733", dated Jul. 16, 2018, 12 Pages.

*Primary Examiner* — LaTanya Bibbins
(74) *Attorney, Agent, or Firm* — Alleman Hall Creasman & Tuttle LLP (57) ABSTRACT

A computing system is provided, including a first display device having a first hardware configuration including a first display and a second display device having a second hardware configuration different from the first hardware configuration and including a second display. The computing system may further include a processor configured to receive an input including instructions to launch an application program on the first display device. The application program may include application program hardware specifications indicating hardware used by the application program. Based on the first hardware configuration, the second hardware configuration, and the application program hardware specifications, the processor may be further configured to determine that the second hardware configuration matches the application program hardware specifications more closely than the first hardware configuration. The processor may be further configured to launch the application program on the second display device.

15 Claims, 7 Drawing Sheets

(51) Int. Cl.
- *G06F 1/16* (2006.01)
- *G05G 5/14* (2006.01)
- *H04M 1/02* (2006.01)
- *G06F 9/451* (2018.01)
- *H04M 1/725* (2021.01)

(52) U.S. Cl.
CPC .......... *G06F 1/1647* (2013.01); *G06F 1/1677* (2013.01); *G06F 1/1681* (2013.01); *G06F 9/451* (2018.02); *G06F 9/54* (2013.01); *H04M 1/0243* (2013.01); *H04M 1/0214* (2013.01); *H04M 1/72569* (2013.01); *H04M 2250/16* (2013.01)

(58) Field of Classification Search
CPC .... G06F 1/1618; G06F 9/5011; G06F 9/5044; G05G 5/14; H04M 1/0243; H04M 1/72569; H04M 2250/16; H04M 1/0214
See application file for complete search history.

(56) References Cited

U.S. PATENT DOCUMENTS

| | | |
|---|---|---|
| 2012/0240054 A1 | 9/2012 | Webber |
| 2013/0021266 A1 | 1/2013 | Selim |
| 2013/0076679 A1 | 3/2013 | Kretz |
| 2013/0135177 A1 | 5/2013 | Tsuruoka |
| 2013/0208417 A1 | 8/2013 | Sirpal |
| 2015/0116364 A1 | 4/2015 | Aurongzeb et al. |
| 2015/0156143 A1 | 6/2015 | Chopde et al. |
| 2015/0317120 A1* | 11/2015 | Kim ................ G06F 3/1438 345/1.3 |
| 2016/0048299 A1 | 2/2016 | Sirpal et al. |
| 2016/0224304 A1* | 8/2016 | Hong ................ H04M 1/72519 |
| 2017/0039019 A1 | 2/2017 | De Paz |
| 2017/0220307 A1* | 8/2017 | Da Silva Ramos .. G06F 1/1647 |

\* cited by examiner

FIG. 1

| FIRST HARDWARE CONFIGURATION 22 | SECOND HARDWARE CONFIGURATION 32 | APPLICATION PROGRAM HARDWARE SPECIFICATIONS 52 |
|---|---|---|
| ☒ TOUCHSCREEN | ☒ TOUCHSCREEN | ☒ TOUCHSCREEN |
| ☐ TRACKPAD | ☐ TRACKPAD | ☐ TRACKPAD |
| ☐ MOUSE | ☐ MOUSE | ☐ MOUSE |
| ☐ KEYBOARD | ☐ KEYBOARD | ☐ KEYBOARD |
| ☐ GAME CONTROLLER | ☐ GAME CONTROLLER | ☐ GAME CONTROLLER |
| ☒ CAMERA | ☒ CAMERA | ☒ CAMERA |
| ☐ AMBIENT LIGHT SENSOR | ☐ AMBIENT LIGHT SENSOR | ☐ AMBIENT LIGHT SENSOR |
| ☐ MICROPHONE | ☒ MICROPHONE | ☒ MICROPHONE |
| ☒ ACCELEROMETER | ☒ ACCELEROMETER | ☒ ACCELEROMETER |
| ☒ SPEAKER | ☒ SPEAKER | ☒ SPEAKER |
| ☐ INDICATOR LIGHT | ☐ INDICATOR LIGHT | ☐ INDICATOR LIGHT |
| ☐ HAPTIC FEEDBACK DEVICE | ☐ HAPTIC FEEDBACK DEVICE | ☐ HAPTIC FEEDBACK DEVICE |
| ☒ RESOLUTION > 800 x 400 | ☒ RESOLUTION > 800 x 400 | ☒ RESOLUTION > 800 x 400 |

DISPLAY DEVICE SELECTION BASED ON HARDWARE CONFIGURATION

CROSS REFERENCE TO RELATED APPLICATIONS

This application claims priority to U.S. Provisional Patent Application No. 62/506,230, filed on May 15, 2017, the entirety of which is hereby incorporated herein by reference.

BACKGROUND

On a multi-screen system, which is configured with different hardware connected to each screen, user interactions with the multi-screen system through an application program may be limited by the hardware configurations and capabilities of each screen. The quality of the user experience may depend upon which screen or combination of screens is used to run the application program. When a user launches the application program on a particular screen, the user may be launching the application program on a screen that provides a lower-quality user experience than another screen of the multi-screen system.

SUMMARY

According to one embodiment of the present disclosure, a computing system is provided, comprising a first display device having a first hardware configuration including a first display and a second display device having a second hardware configuration different from the first hardware configuration and including a second display. The computing system may further comprise a processor configured to receive an input including instructions to launch an application program on the first display device. The application program may include application program hardware specifications indicating hardware used by the application program. Based on the first hardware configuration, the second hardware configuration, and the application program hardware specifications, the processor may be further configured to determine that the second hardware configuration matches the application program hardware specifications more closely than the first hardware configuration. The processor may be further configured to launch the application program on the second display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
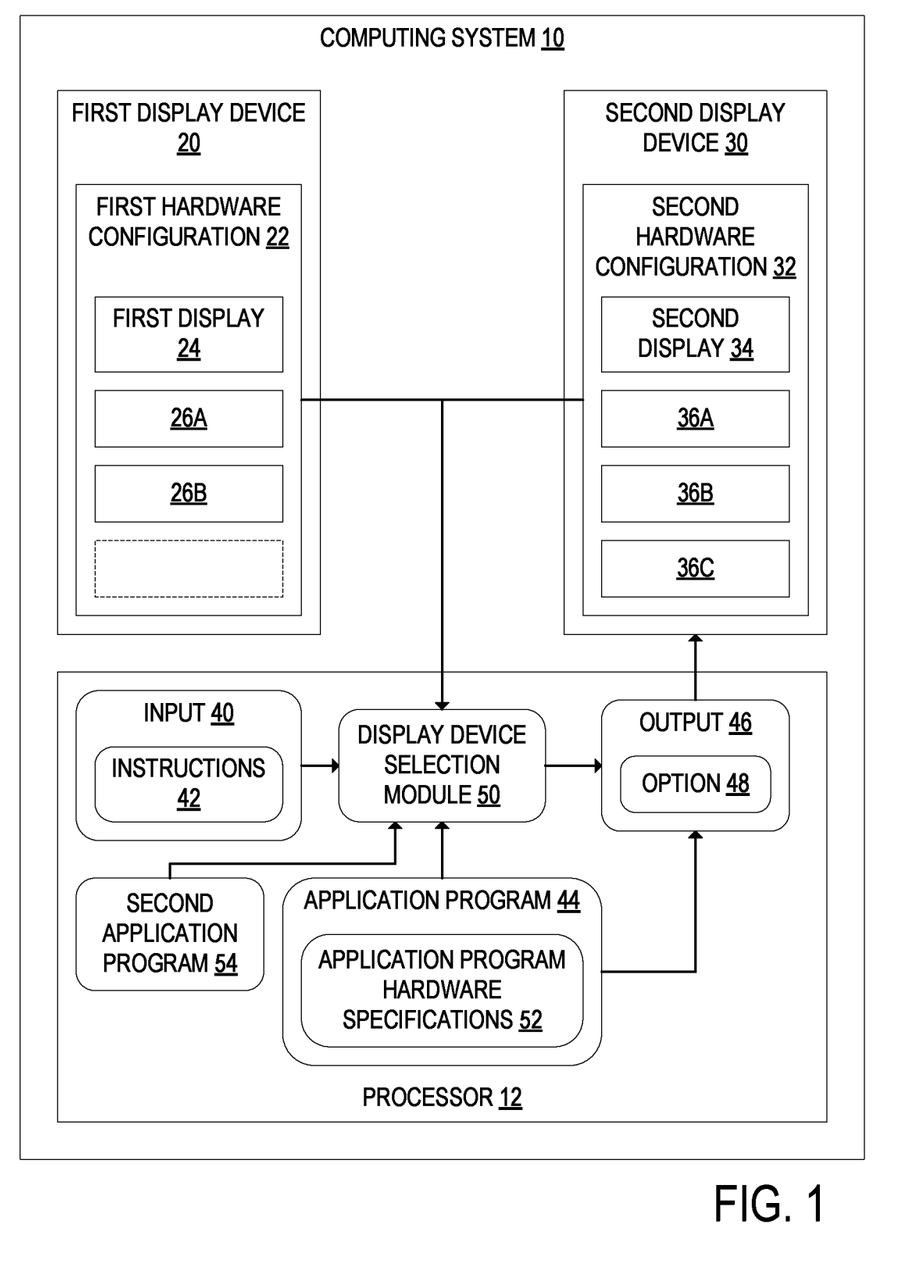
FIG. 1 schematically depicts a computing system including a first display device and a second display device, according to one embodiment of the present disclosure.

In order to address the challenges discussed above, a computing system is disclosed herein. FIG. 1 schematically depicts a computing system 10 according to one embodiment of the present disclosure. The computing system 10 includes a first display device 20 having a first hardware configuration 22 including a first display 24. The first hardware configuration 22 may further include first additional hardware devices 26. In the example embodiment of FIG. 1, the first additional hardware devices 26 include first additional hardware devices 26A and 26B. The computing system 10 further includes a second display device 30 having a second hardware configuration 32 different from the first hardware configuration 22 and including a second display 34. The second hardware configuration 32 may further include second additional hardware devices 36. In the example embodiment of FIG. 1, the second additional hardware devices 36 include second additional hardware devices 36A, 36B, and 36C. The second hardware configuration 32 is different from the first hardware configuration 22 in that it includes the second additional hardware device 36C, which has no counterpart in the first hardware configuration 22. The first additional hardware devices 26 and the second additional hardware devices 36 may be any combination of input and output devices. In some embodiments, at least one of the first hardware configuration 22 and the second hardware configuration 32 may include at least one input device selected from the group consisting of touchscreen, trackpad, stylus, pen, mouse, keyboard, game controller, camera, ambient light sensor, microphone, and accelerometer. Also, in some embodiments, at least one of the first hardware configuration 22 and the second hardware configuration 32 may include at least one output device selected from the group consisting of speaker, indicator light, and haptic feedback device.

The computing system 10 further comprises a processor 12. The processor 12 is configured to receive an input 40 including instructions 42 to launch an application program 44 on the first display device 20. The input 40 may be received via an input device included in the first hardware configuration 22. The application program 44 includes application program hardware specifications 52 indicating hardware used by the application program 44. The application program hardware specifications 52 may include minimum hardware specifications with which the application program 44 may be run. Alternatively or additionally, the application program hardware specifications 52 may include an indication of additional hardware beyond the minimum hardware specifications, the utilization of which may enhance the user experience. For example, the application program hardware specifications 52 may include a minimum screen resolution and a preferred screen resolution.

Based on the first hardware configuration 22, the second hardware configuration 32, and the application program hardware specifications 52, the processor 12 is further configured to determine that the second hardware configuration 32 matches the application program hardware specifications 52 more closely than the first hardware configuration 22. This determination may be made at a display device selection module 50.

Figure 2:
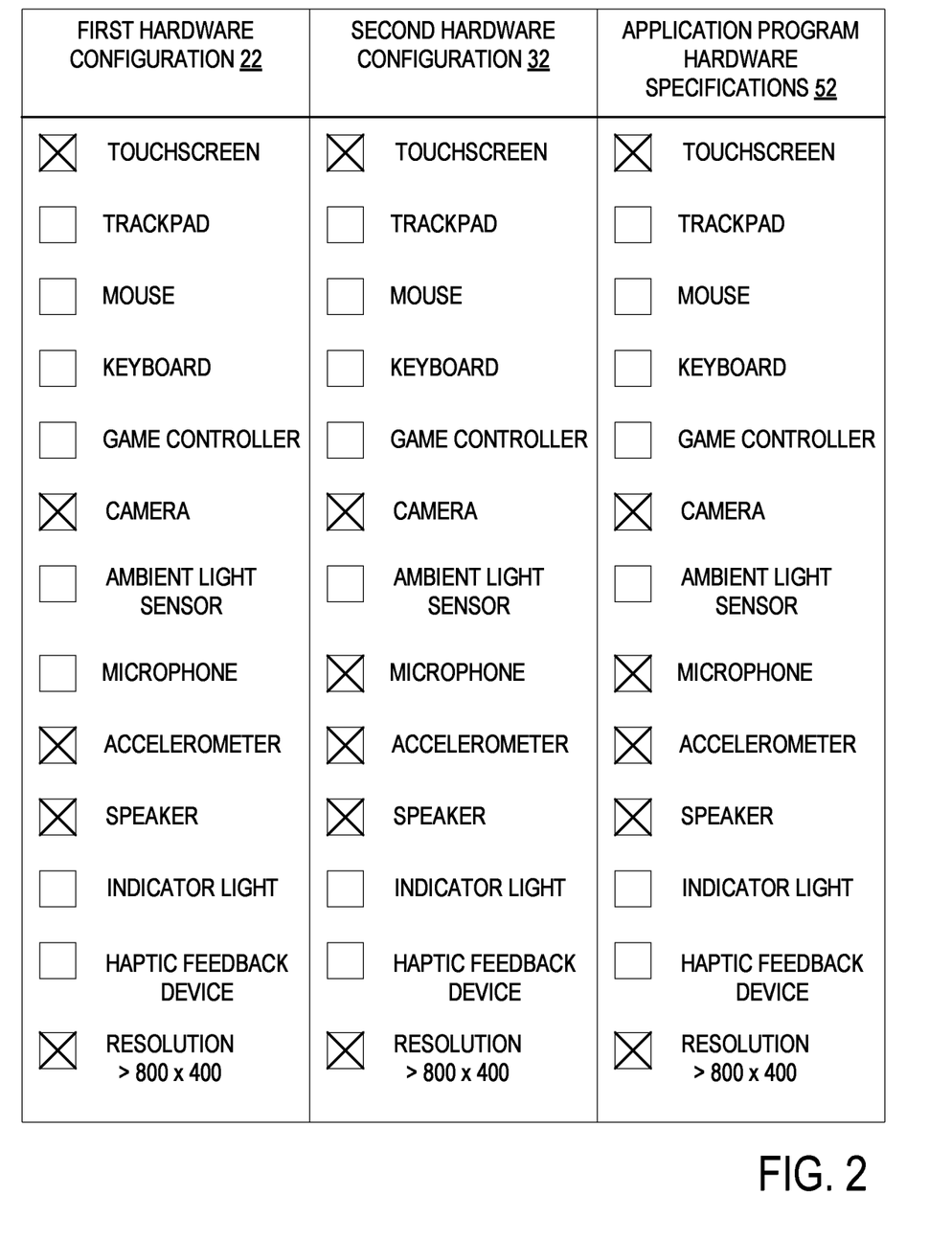
FIG. 2 shows a table that lists hardware devices included in each of an example first hardware configuration, second hardware configuration, and application program hardware specifications, according to the embodiment of FIG. 1.

The determination that the second hardware configuration 32 matches the application program hardware specifications 52 more closely than the first hardware configuration 22 includes a determination that the first hardware configuration 22 does not include at least one hardware device included in the second hardware configuration 32. An example of such a determination is shown in FIG. 2. FIG. 2 shows a table that lists hardware devices included in each of an example first hardware configuration 22, second hardware configuration 32, and application program hardware specifications 52. In the example table of FIG. 2, the second hardware configuration 32 and the application program hardware specifications 52 both include a microphone, whereas the first hardware configuration 22 does not. The second hardware configuration 32 therefore matches the application program hardware specifications 52 more closely than the first hardware configuration 22. Although the at least one hardware device included in the second hardware configuration 32 but not the first hardware configuration 22 in the example embodiment of FIG. 2 is a microphone, the at least one hardware device may be one or more input and/or output devices.

In some embodiments, the display device selection module 50 may determine that the second hardware configuration 32 matches the application program hardware specifications 52 more closely than the first hardware configuration 22 by making other determinations. For example, the determination that that the second hardware configuration 32 matches the application program hardware specifications 52 more closely than the first hardware configuration 22 may include a determination that at least one hardware device included in the first hardware configuration 22 is in use by a second application program 54. The at least one hardware device may be one or more input and/or output devices. Additionally or alternatively, the determination that that the second hardware configuration 32 matches the application program hardware specifications 52 more closely than the first hardware configuration 22 may be based at least in part on a resolution of the first display 24 and a resolution of the second display 34.

After the processor 12 determines that the second hardware configuration 32 matches the application program hardware specifications 52 more closely than the first hardware configuration 22, the processor 12 may be further configured to convey to a user an output 46 including an option 48 to launch the application program on the second display device 30. In response to selection of the option 48, the processor 12 may be further configured to launch the application program 44 on the second display device 30.

Figures 3A, 3B:
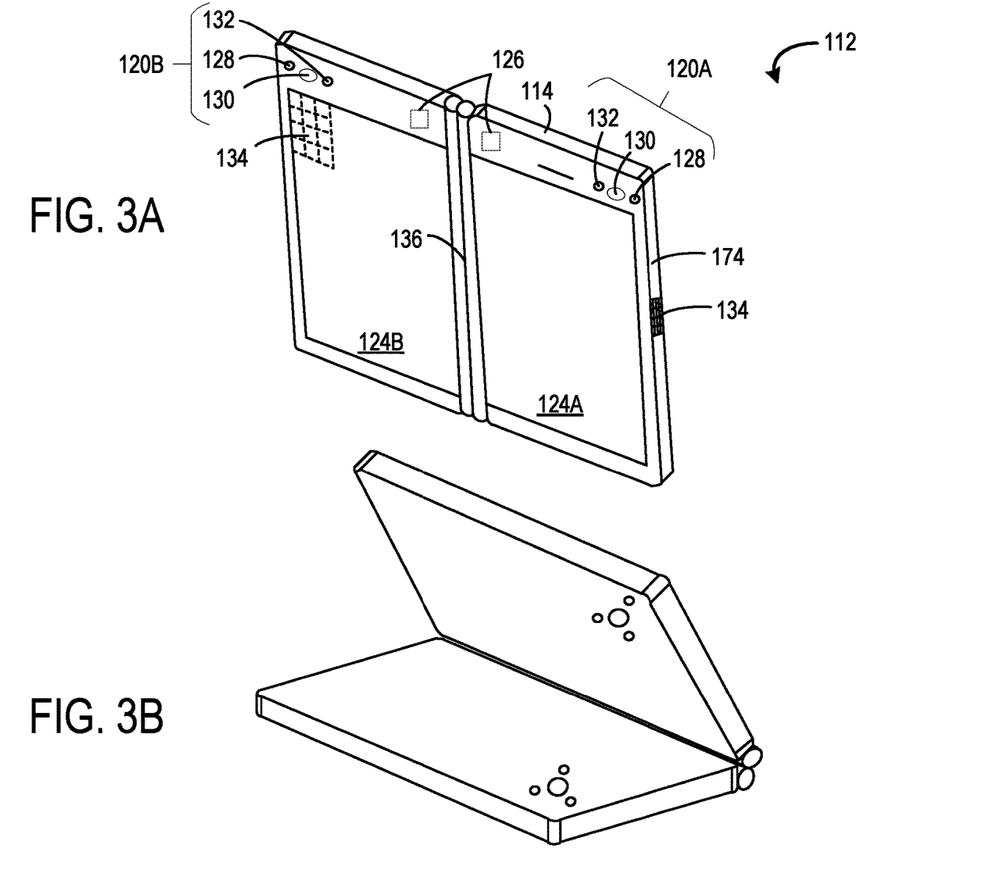
FIG. 3A shows an example of two display screens arranged in a side-by-side orientation for the mobile computing device of FIG. 1.
FIG. 3B shows an example of two display screens arranged in an obtuse orientation for the mobile computing device of FIG. 1.

Turning to FIG. 3A, an example physical embodiment of computing system 10 formed as an example mobile computing device 112 is illustrated. As shown, the example mobile computing device 112 includes a housing 114 and example display devices 124A and 124B, which may be the first display device 20 and the second display device 30 of FIG. 1. The housing 114 may be configured to internally house various electronic components of the example mobile computing device 112. Additionally, the housing 114 may provide structural support for display devices 124 and sensor devices 120. In the illustrated example, the sensor devices 120 include one or more accelerometers 126 that are contained by the housing 114. The sensor devices 120 may further include forward facing cameras 130. In one example, the forward-facing cameras 130 include RGB cameras. However, it will be appreciated that other types of cameras may also be included in the forward-facing cameras 130. In this example, forward facing is a direction of the camera's associated display device. Thus, in the example of FIG. 3A, as the screens for both of an example pair of display devices 124A and 124B are facing the same direction, both of the forward-facing cameras 130 are also facing the same direction. The sensor devices 120 further include an ambient light sensor 128 and a depth camera 132.

As shown, the sensor devices 120 may also include capacitive touch sensors 134 that are integrated with the pair of display devices 124A and 124B, as well as other additional displays. In the illustrated embodiment, the capacitive touch sensors 134 include a capacitive grid configured to sense changes in capacitance caused by objects on or near the display devices, such as a user's finger, hand, stylus, pen, etc. In one embodiment, the capacitive touch sensors 134 may also be included on one or more sides of the mobile computing device 112. For example, the capacitive touch sensors 134 may be additionally integrated into the sides of the housing 114 of the mobile computing device 112. While the capacitive touch sensors 134 are illustrated in a capacitive grid configuration, it will be appreciated that other types of capacitive touch sensors and configurations may also be used, such as, for example, a capacitive diamond configuration. In other examples, the sensor devices 120 may include camera-in-pixel devices integrated with each display device including the pair of display devices 124A and 124B. It will be appreciated that the sensor devices 120 may include other sensors not illustrated in FIG. 3A.

In the example mobile computing device 112 illustrated in FIG. 3A, the two example display devices 124A and 124B are movable relative to each other. As shown, the housing including a hinge 136 between a pair of display devices 124A and 124B of the two or more display devices 124, the hinge 136 being configured to permit the pair of display devices 124A and 124B to rotate between angular orientations from a face-to-face angular orientation to a back-to-back angular orientation.

Now turning to FIG. 3B, the hinge 136 permits the pair of display devices 124A and 124B to rotate relative to one another such that an angle between the pair of display devices 124A and 124B can be decreased or increased by the user via applying suitable force to the housing 114 of the mobile computing device 112. As shown in FIG. 3B, the pair of display devices 124A and 124B may be rotated until the pair of display devices 124A and 124B reach a back-to-back angular orientation as shown in FIG. 3C.

In some embodiments, the determination that that the second hardware configuration 32 matches the application program hardware specifications 52 more closely than the first hardware configuration 22 may include a determination that at least one hardware device included in the first hardware configuration 22 is at least partially obstructed by the second display device 30. For example, when the mobile computing device 112 is in the back-to-back angular orientation shown in FIG. 3C, the second display device 124B may be obstructed by the first display device 124A when the mobile computing device 112 is viewed from the side of the first display device 124A. The at least one hardware device that is at least partially obstructed by the second display device 30 may be one or more input and/or output devices. The second display device 30 may partially or fully obstruct at least one hardware device included in the first hardware configuration 22 when the first display device 20 and the second display device 30 are connected by a hinge, as in the embodiment of FIGS. 3A-3D. In such embodiments, the determination that the at least one hardware device is at least partially obstructed by the second display device 30 may be based at least in part on a hinge pose of the hinge 136. The hinge pose may be an angle between the first display 24 and the second display 34, which may be detected by a hinge angle sensor and/or inertial motion unit of the first display device 20 and/or the second display device 30. In embodiments in which the computing system 10 includes a plurality of hinges, the hinge pose may include an angle of each hinge of the plurality of hinges.

Figures 3C, 3D:
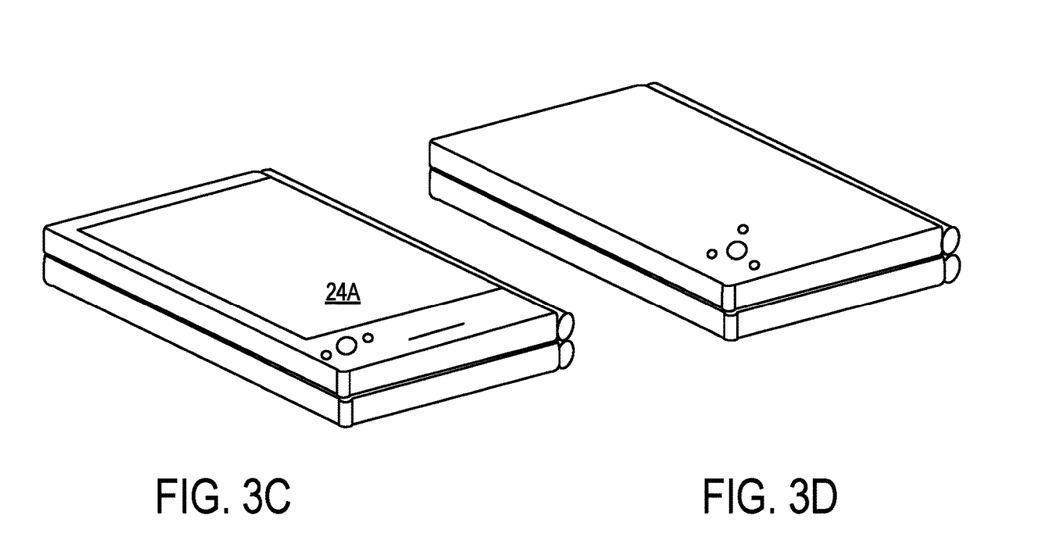
FIG. 3C shows an example of two display screens arranged in a back-to-back orientation for the mobile computing device of FIG. 1.
FIG. 3D shows an example of two display screens arranged in a face-to-face orientation for the mobile computing device of FIG. 1.

As illustrated in FIG. 3C, while in an angular orientation where the pair of display devices 124A and 124B are in a back-to-back angular orientation, the pair of display devices 124A and 124B face away from each other. Thus, while using the mobile computing device 112, the user may only be able to view one of the display devices of the pair of display devices 124A and 124B at a time. The processor 12 may therefore determine that one of the display devices 124 is obstructed, and based on this determination, may determine that the second hardware configuration 32 matches the application program hardware specifications 52 more closely than the first hardware configuration 22. Additionally, while in a back-to-back angular orientation, sensor packages 120A and 120B of the sensor devices 120, which may each include ambient light sensors 128, forward facing cameras 130, and depth cameras 132, also face in the same direction as their respective display device, and thus also face away from each other.

As shown in FIG. 3D, the angular orientation between the pair of display devices 124A and 124B may also rotate to a face-to-face orientation where the pair of display devices face each other. Such an angular orientation may help protect the screens of the display devices.

Figure 4:
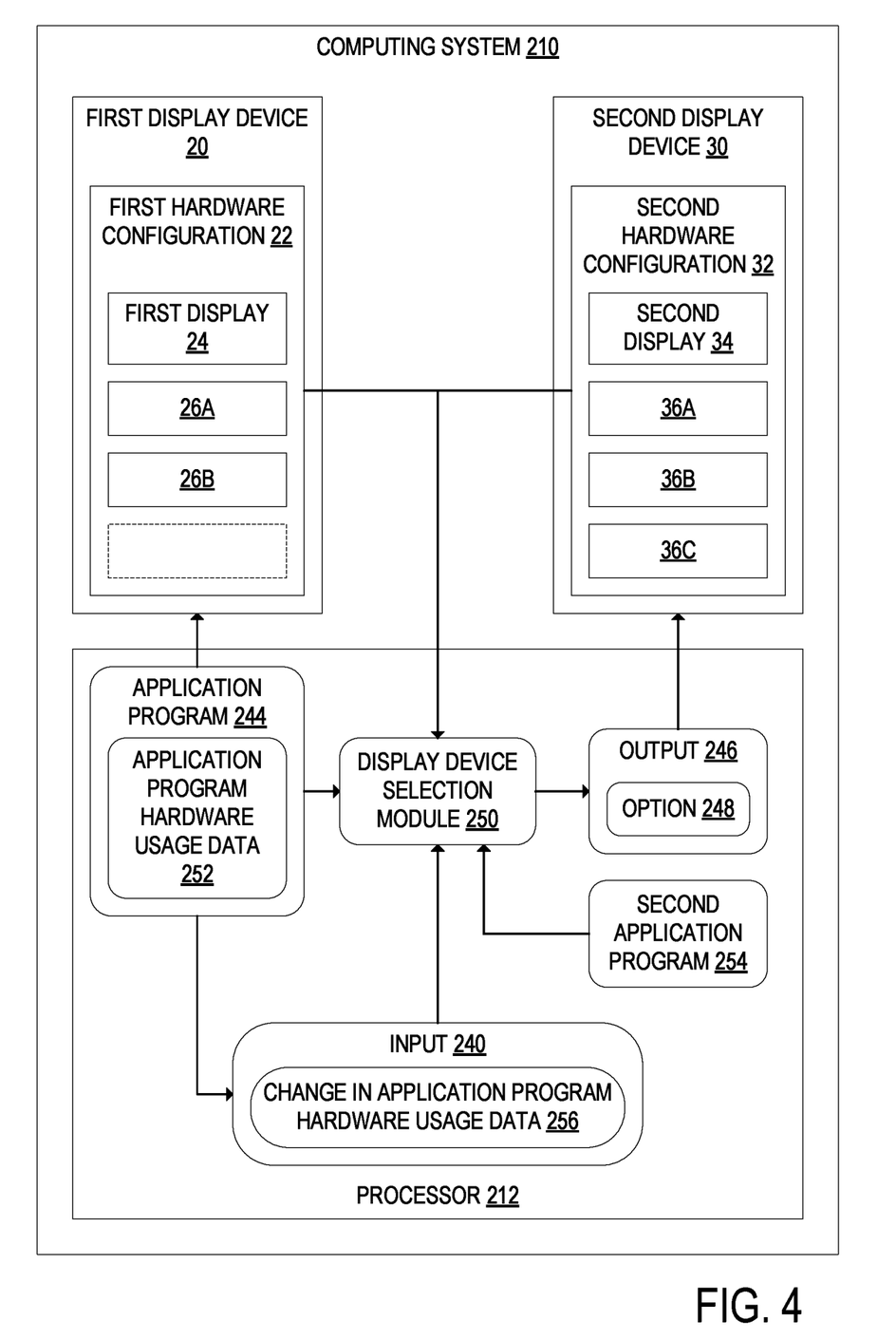
FIG. 4 schematically depicts a computing system including a first display device and a second display device, according to another embodiment of the present disclosure.

In some embodiments, the processor may dynamically transfer the application program between the first display device 20 and the second display device 30 as the application program is running. FIG. 4 schematically depicts a computing system 210 according to another embodiment of the present disclosure. As shown in FIG. 4, the processor 212 is configured to run an application program 244 on the first display device 20. The application program 244 depicted in FIG. 4 includes application program hardware usage data 252 indicating hardware currently used by the application program 244. The processor 212 is configured to receive from the application program 244 an input 240 including a change in the application program hardware usage data 256. The processor 212 may send the input 240, the first hardware configuration 22, and the second hardware configuration 32 to the display device selection module 250. Based on the first hardware configuration 22, the second hardware configuration 32, and the change in the application program hardware usage data 256, the display device selection module 250 may transfer the application program 244 from the first display device 20 to the second display device 30. The processor 212 may be configured to convey to a user an output 246 including an option 248 to transfer the application program on the second display device 30. In response to selection of the option 248, the processor 212 may be configured to transfer the application program 244 from the first display device to the second display device 30.

In the embodiment of FIG. 4, the application program 244 may be transferred from the first display device 20 to the second display device 30 based at least in part on a determination that the first hardware configuration 22 does not include at least one hardware device included in the second hardware configuration 32. The at least one hardware device may be one or more input and/or output devices. Additionally or alternatively, the application program 244 may be transferred from the first display device 20 to the second display device 30 based at least in part on a determination that at least one hardware device included in the first hardware configuration 22 is at least partially obstructed by the second display device 30. Additionally or alternatively, the application program 244 may be transferred from the first display device 20 to the second display device 30 based at least in part on a determination that at least one hardware device included in the first hardware configuration 22 is in use by a second application program 254.

Although the example embodiments disclosed above are directed to computing systems that include a first display device and a second display device, computing systems including three or more display devices are also contemplated. In such embodiments, a processor may be configured to select a display device of a plurality of display devices on which to launch, or to which to transfer, an application program. This selection may be based at least in part on a hardware configuration of each display device of the plurality of display devices.

Figure 5:
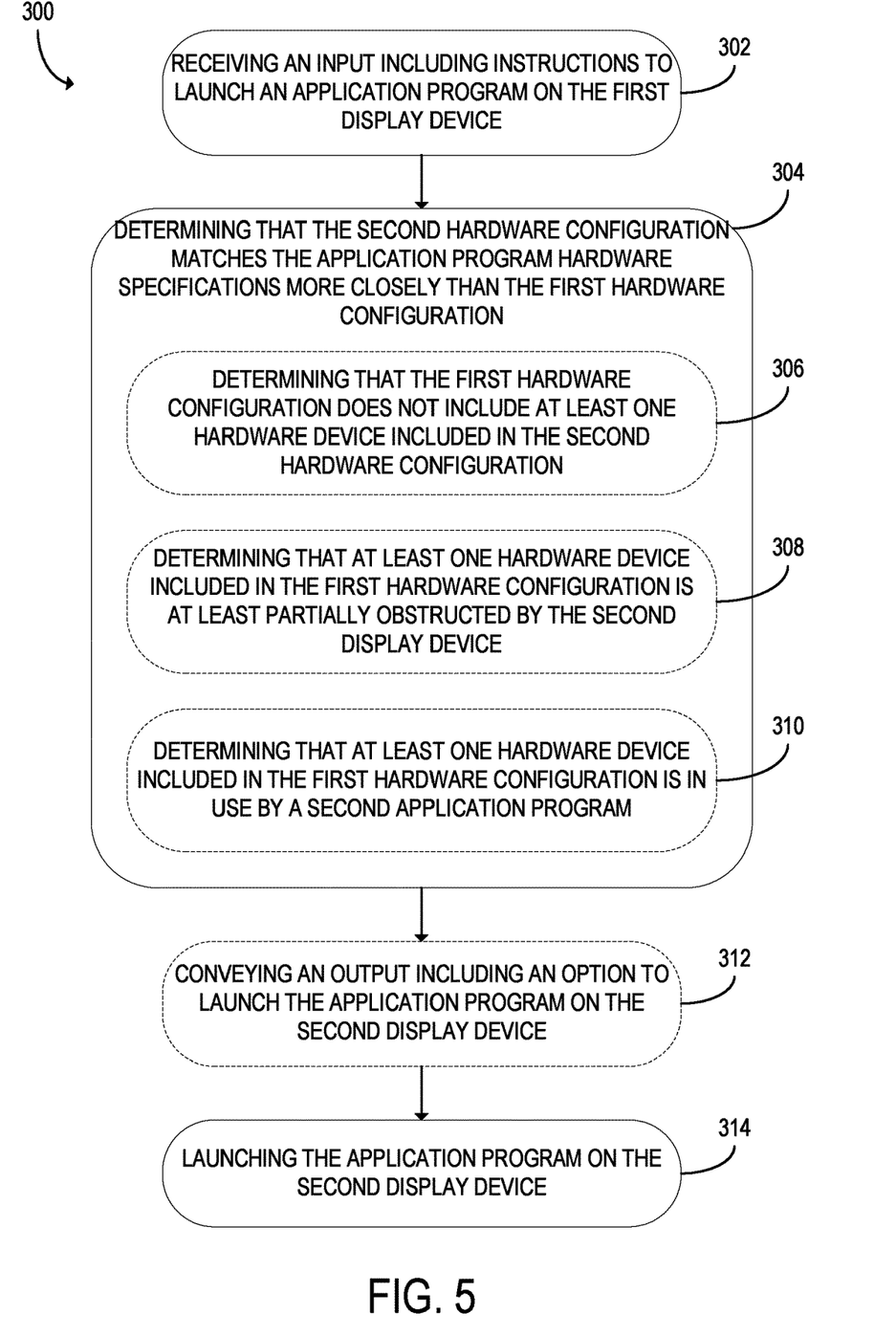
FIG. 5 shows a flowchart of a method for use with a computing system, according to the embodiment of FIG. 1.

FIG. 5 shows a flowchart of an example method 300 for use with a computing system. The computing system with which the method 300 may be used may be the computing system 10 of FIG. 1, and may include a first display device having a first hardware configuration including a first display, a second display device having a second hardware configuration different from the first hardware configuration and including a second display, and a processor. At step 302, the method 300 may include receiving an input including instructions to launch an application program on the first display device. The application program may include application program hardware specifications indicating hardware used by the application program.

At step 304, the method may further include determining that the second hardware configuration matches the application program hardware specifications more closely than the first hardware configuration. This determination may be based at least in part on the first hardware configuration, the second hardware configuration, and the application program hardware specifications. In some embodiments, step 304 may include, at step 306, determining that the first hardware configuration does not include at least one hardware device included in the second hardware configuration. Additionally or alternatively, step 304 may include, at step 308, determining that at least one hardware device included in the first hardware configuration is at least partially obstructed by the second display device. Additionally or alternatively, step 304 may include, at step 310, determining that at least one hardware device included in the first hardware configuration is in use by a second application program.

At step 312, the method 300 may optionally include, in some embodiments, conveying an output including an option to launch the application program on the second display device. At step 314, the method may further include launching the application program on the second display device. In embodiments in which an output including an option to launch the application program on the second display device is conveyed, the application may be launched on the second display device in response to selection of the option. In other embodiments, the application program may be launched on the second display device automatically.

Figure 6:
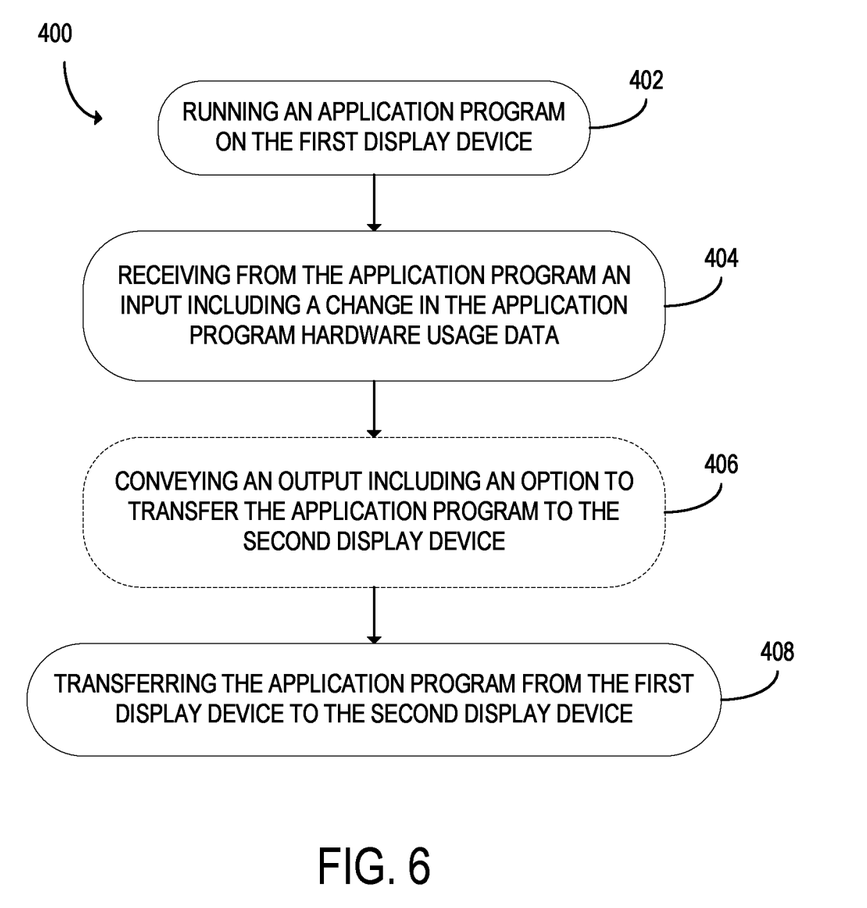
FIG. 6 shows a flowchart of a method for use with a computing system, according to the embodiment of FIG. 4.

FIG. 6 shows a flowchart of another example method 400 for use with a computing system. The computing system with which the method 400 may be used may be the computing system 210 of FIG. 4, and may include a first display device having a first hardware configuration including a first display, a second display device having a second hardware configuration different from the first hardware configuration and including a second display, and a processor. At step 402, the method 400 may include running an application program on the first display device. The application program may include application program hardware usage data indicating hardware currently used by the application program.

At step 404, the method may further include receiving from the application program an input including a change in the application program hardware usage data. At step 408, the method may further include transferring the application program from the first display device to the second display device. The application program may be transferred based at least in part on the first hardware configuration, the second hardware configuration, and the change in the application program hardware usage data. In addition, in some embodiments, the application program may be transferred from the first display device to the second display device based at least in part on a determination that the first hardware configuration does not include at least one hardware device included in the second hardware configuration. Additionally or alternatively, the application program may be transferred from the first display device to the second display device based at least in part on a determination that at least one hardware device included in the first hardware configuration is at least partially obstructed by the second display device. Additionally or alternatively, the application program may be transferred from the first display device to the second display device based at least in part on a determination that at least one hardware device included in the first hardware configuration is in use by a second application program.

At step 406, the method 400 may optionally include, prior to transferring the application program, conveying an output including an option to transfer the application program to the second display device. When such an output is conveyed, the application program may be transferred to the second display device in response to selection of the option.

Figure 7:
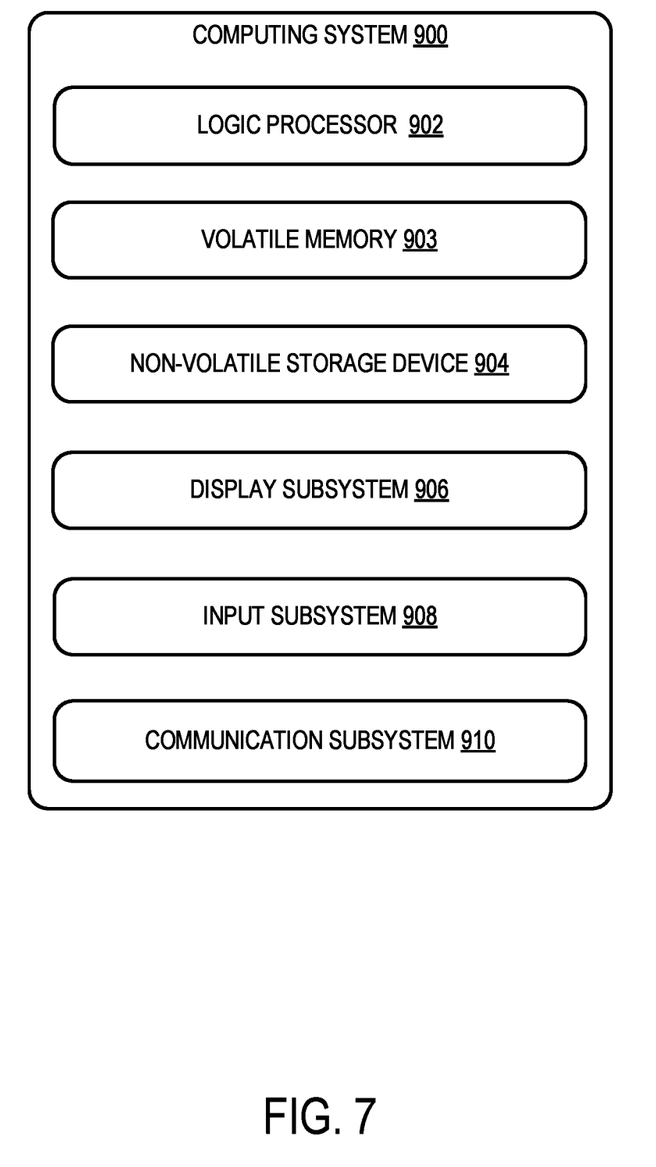
FIG. 7 shows an example computing system according to an embodiment of the present disclosure.

FIG. 7 schematically shows a non-limiting embodiment of a computing system 900 that can enact one or more of the methods and processes described above. Computing system 900 is shown in simplified form. Computing system 900 may embody the computing system 10 of FIG. 1 or the computing system 210 of FIG. 4. Computing system 900 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 900 includes a logic processor 902 volatile memory 903, and a non-volatile storage device 904. Computing system 900 may optionally include a display subsystem 906, input subsystem 908, communication subsystem 910, and/or other components not shown in FIG. 7.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processors to implement the methods and processes described herein. When such methods and processes are implemented, the state of non-volatile storage device 904 may be transformed—e.g., to hold different data.

Non-volatile storage device 904 may include physical devices that are removable and/or built-in. Non-volatile storage device 904 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 910 may be configured to communicatively couple various computing devices described herein with each other, and with other devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

According to a first aspect of the present disclosure, a computing system is provided, comprising a first display device having a first hardware configuration including a first display. The computing system may further comprise a second display device having a second hardware configuration different from the first hardware configuration and including a second display. The computing system may further comprise a processor configured to receive an input including instructions to launch an application program on the first display device. The application program may include application program hardware specifications indicating hardware used by the application program. Based on the first hardware configuration, the second hardware configuration, and the application program hardware specifications, the processor may be further configured to determine that the second hardware configuration matches the application program hardware specifications more closely than the first hardware configuration. The processor may be further configured to launch the application program on the second display device.

According to this aspect, the determination that the second hardware configuration matches the application program hardware specifications more closely than the first hardware configuration may include a determination that the first hardware configuration does not include at least one hardware device included in the second hardware configuration.

According to this aspect, the determination that that the second hardware configuration matches the application program hardware specifications more closely than the first hardware configuration may include a determination that at least one hardware device included in the first hardware configuration is at least partially obstructed by the second display device. According to this aspect, the first display device and the second display device may be connected by a hinge. According to this aspect, the determination that the at least one hardware device is at least partially obstructed by the second display device may be based at least in part on a hinge pose of the hinge.

According to this aspect, the determination that that the second hardware configuration matches the application program hardware specifications more closely than the first hardware configuration may include a determination that at least one hardware device included in the first hardware configuration is in use by a second application program.

According to this aspect, the determination that that the second hardware configuration matches the application program hardware specifications more closely than the first hardware configuration may be based at least in part on a resolution of the first display and a resolution of the second display.

According to this aspect, the processor may be further configured to convey an output including an option to launch the application program on the second display device. The processor may be further configured to, in response to selection of the option, launch the application program on the second display device.

According to this aspect, at least one of the first hardware configuration and the second hardware configuration may include at least one input device selected from the group consisting of touchscreen, trackpad, stylus, pen, mouse, keyboard, game controller, camera, ambient light sensor, microphone, and accelerometer.

According to this aspect, at least one of the first hardware configuration and the second hardware configuration may include at least one output device selected from the group consisting of speaker, indicator light, and haptic feedback device.

According to another aspect of the present disclosure, a computing system is provided, comprising a first display device having a first hardware configuration including a first display. The computing system may further comprise a second display device having a second hardware configuration including a second display. The computing system may further comprise a processor configured to run an application program on the first display device. The application program may include application program hardware usage data indicating hardware currently used by the application program. The processor may be further configured to receive from the application program an input including a change in the application program hardware usage data. The processor may be further configured to, based on the first hardware configuration, the second hardware configuration, and the change in the application program hardware usage data, transfer the application program from the first display device to the second display device.

According to this aspect, the application program may be transferred from the first display device to the second display device based at least in part on a determination that the first hardware configuration does not include at least one hardware device included in the second hardware configuration.

According to this aspect, the application program may be transferred from the first display device to the second display device based at least in part on a determination that at least one hardware device included in the first hardware configuration is at least partially obstructed by the second display device.

According to this aspect, wherein the application program may be transferred from the first display device to the second display device based at least in part on a determination that at least one hardware device included in the first hardware configuration is in use by a second application program.

According to this aspect, the processor may be further configured to convey an output including an option to transfer the application program to the second display device. The processor may be further configured to, in response to selection of the option, transfer the application program to the second display device.

According to another aspect of the present disclosure, a method for use with a computing system is provided. The computing system may include a first display device having a first hardware configuration including a first display, a second display device having a second hardware configuration different from the first hardware configuration and including a second display, and a processor. The method may comprise receiving an input including instructions to launch an application program on the first display device. The application program may include application program hardware specifications indicating hardware used by the application program. Based on the first hardware configuration, the second hardware configuration, and the application program hardware specifications, the method may further comprise determining that the second hardware configuration matches the application program hardware specifications more closely than the first hardware configuration. The method may further comprise launching the application program on the second display device.

According to this aspect, determining that the second hardware configuration matches the application program hardware specifications more closely than the first hardware configuration may include determining that the first hardware configuration does not include at least one hardware device included in the second hardware configuration.

According to this aspect, determining that that the second hardware configuration matches the application program hardware specifications more closely than the first hardware configuration may include determining that at least one hardware device included in the first hardware configuration is at least partially obstructed by the second display device.

According to this aspect, determining that that the second hardware configuration matches the application program hardware specifications more closely than the first hardware configuration may include determining that at least one hardware device included in the first hardware configuration is in use by a second application program.

According to this aspect, the method may further comprise conveying an output including an option to launch the application program on the second display device, and, in response to selection of the option, launching the application program on the second display device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a first display device including a first display and a first hardware configuration of one or more hardware devices integrated with the first display device in addition to the first display;
a second display device including a second display and a second hardware configuration of one or more hardware devices integrated with the second display device in addition to the second display, the second hardware configuration being different from the first hardware configuration; and
a processor configured to:
receive an input including instructions to launch a first application program on the first display device, wherein the first application program includes application program hardware specifications indicating hardware devices used by the first application program;
based on the first hardware configuration, the second hardware configuration, and the application program hardware specifications, determine that the second hardware configuration matches the application program hardware specifications more closely than the first hardware configuration at least in part by determining that at least one hardware device of the one or more hardware devices included in the first hardware configuration and indicated by the application program hardware specifications is in use by a second application program; and
launch the first application program on the second display device in response to determining that the at least one hardware device is in use by the second application program,
wherein the one or more hardware devices included in the first hardware configuration and the one or more hardware devices included in the second hardware configuration are each selected from the group consisting of a trackpad, a stylus, a pen, a mouse, a keyboard, a game controller, a camera, an ambient light sensor, a microphone, and an accelerometer.

2. The computing system of claim 1, wherein the determination that the second hardware configuration matches the application program hardware specifications more closely than the first hardware configuration includes a determination that the first hardware configuration does not include at least one hardware device included in the second hardware configuration.

3. The computing system of claim 1, wherein the determination that that the second hardware configuration matches the application program hardware specifications more closely than the first hardware configuration includes a determination that at least one hardware device included in the first hardware configuration is at least partially obstructed by the second display device.

4. The computing system of claim 3, wherein the first display device and the second display device are connected by a hinge.

5. The computing system of claim 4, wherein the determination that the at least one hardware device is at least partially obstructed by the second display device is based at least in part on a hinge pose of the hinge.

6. The computing system of claim 1, wherein the determination that that the second hardware configuration matches the application program hardware specifications more closely than the first hardware configuration is based at least in part on a resolution of the first display and a resolution of the second display.

7. The computing system of claim 1, wherein the processor is further configured to:
convey an output including an option to launch the first application program on the second display device; and
in response to selection of the option, launch the first application program on the second display device.

8. A computing system, comprising:
a first display device including a first display and a first hardware configuration of one or more hardware devices integrated with the first display device in addition to the first display;
a second display device including a second display and a second hardware configuration of one or more hardware devices integrated with the second display device in addition to the second display, the second hardware configuration being different from the first hardware configuration; and
a processor configured to:
run a first application program on the first display device, wherein the first application program includes application program hardware usage data indicating hardware devices currently used by the first application program;
receive from the first application program an input including a change in the application program hardware usage data; and
based on the first hardware configuration, the second hardware configuration, the change in the application program hardware usage data, and a determination that at least one hardware device of the one or more hardware devices included in the first hardware configuration and indicated by the application program hardware specifications is in use by a second application program, transfer the first application program from the first display device to the second display device in response to determining that the at least one hardware device is in use by the second application program,
wherein the one or more hardware devices included in the first hardware configuration and the one or more hardware devices included in the second hardware configuration are each selected from the group consisting of a speaker, an indicator light, and a haptic feedback device.

9. The computing system of claim 8, wherein the first application program is transferred from the first display device to the second display device based at least in part on a determination that the first hardware configuration does not include at least one hardware device included in the second hardware configuration.

10. The computing system of claim 8, wherein the first application program is transferred from the first display device to the second display device based at least in part on a determination that at least one hardware device included in the first hardware configuration is at least partially obstructed by the second display device.

11. The computing system of claim 8, wherein the processor is further configured to:
convey an output including an option to transfer the first application program to the second display device; and
in response to selection of the option, transfer the first application program to the second display device.

12. A method for use with a computing system that includes a first display device including a first display and a first hardware configuration of one or more hardware devices integrated with the first display device in addition to the first display, a second display device including a second display and a second hardware configuration different from the first hardware configuration, and a processor, the method comprising:
receiving an input including instructions to launch a first application program on the first display device, wherein the first application program includes application program hardware specifications indicating hardware devices used by the first application program;
based on the first hardware configuration, the second hardware configuration, and the application program hardware specifications, determining that the second hardware configuration matches the application program hardware specifications more closely than the first hardware configuration at least in part by determining that at least one hardware device of the one or more hardware devices included in the first hardware configuration and indicated by the application program hardware specifications is in use by a second application program; and
launching the first application program on the second display device in response to determining that the at least one hardware device is in use by the second application program,
wherein the one or more hardware devices included in the first hardware configuration and the one or more hardware devices included in the second hardware configuration are each selected from the group consisting of a trackpad, a stylus, a pen, a mouse, a keyboard, a game controller, a camera, an ambient light sensor, a microphone, and an accelerometer.

13. The method of claim 12, wherein determining that the second hardware configuration matches the application program hardware specifications more closely than the first hardware configuration includes determining that the first hardware configuration does not include at least one hardware device included in the second hardware configuration.

14. The method of claim 12, wherein determining that that the second hardware configuration matches the application program hardware specifications more closely than the first hardware configuration includes determining that at least one hardware device included in the first hardware configuration is at least partially obstructed by the second display device.

15. The method of claim 12, further comprising:
conveying an output including an option to launch the first application program on the second display device; and
in response to selection of the option, launching the first application program on the second display device.

* * * * *